March 6, 1928.
O. WADDELL
RESILIENT WHEEL
Filed Feb. 11, 1927
1,661,643
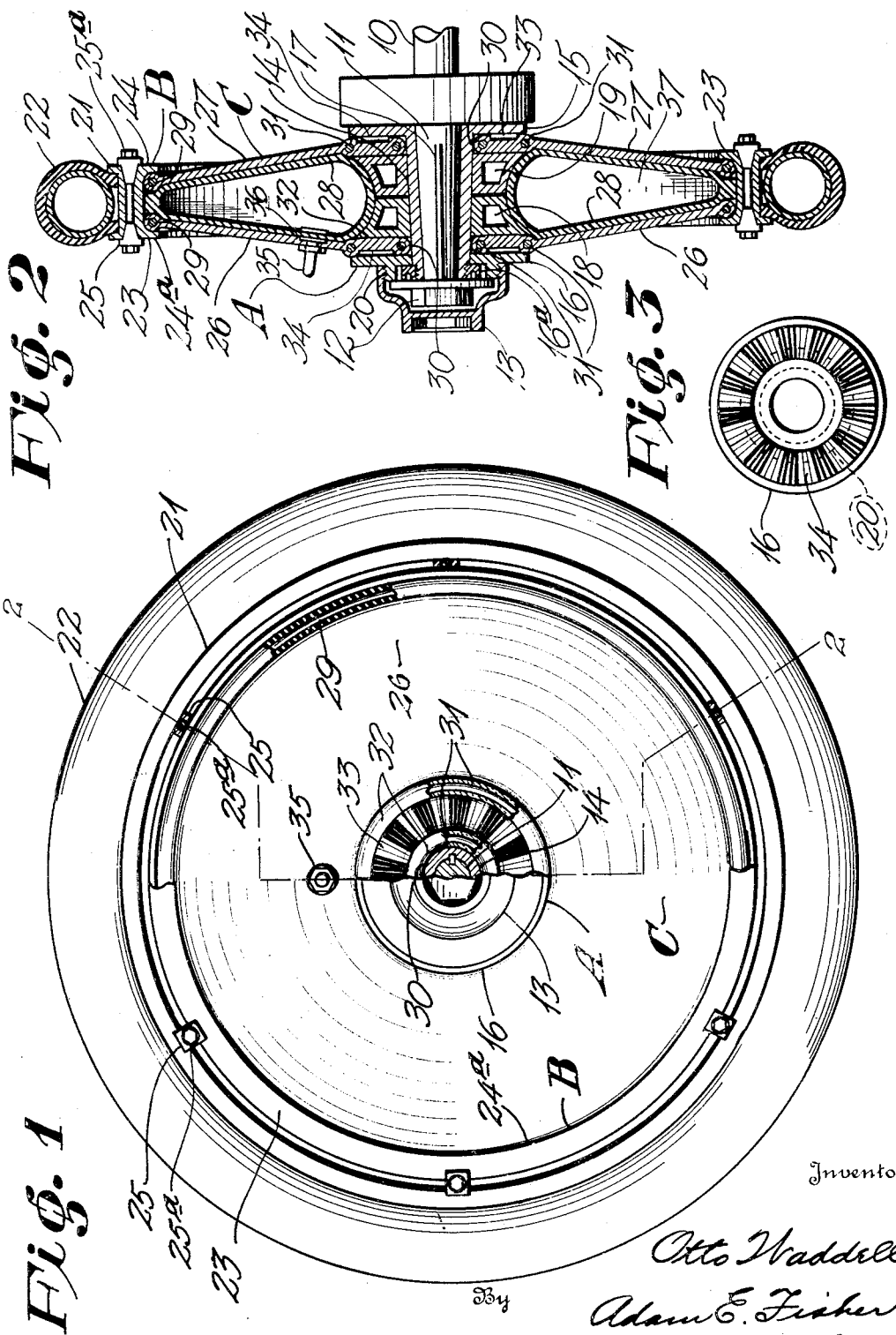

Patented Mar. 6, 1928.

1,661,643

UNITED STATES PATENT OFFICE.

OTTO WADDELL, OF RADERSBURG, MONTANA.

RESILIENT WHEEL.

Application filed February 11, 1927. Serial No. 167,403.

This invention relates to resilient wheels, and more especially to those having hubs cushioned by pneumatic means; and the object of the same is to produce a wheel of this character wherein the hub is connected with an inner rim in such manner as to permit a certain amount of relative movement between these parts.

Another object of my invention is to provide a wheel having a separate hub and rim, between which a resilient tube containing air under pressure is disposed so as to absorb vibration and shock.

With the above and other objects in view, my invention consists in the combination and arrangement of parts hereinafter described and claimed, and more fully illustrated in the accompanying drawings, wherein Figure 1 is an outer side elevation of the wheel, part thereof being shown in section.

Figure 2 is a section through the wheel on the line 2—2 of Figure 1.

Figure 3 is a detail view of one of the hub plates showing the corrugations thereon.

In the drawings is shown an automobile rear wheel, but obviously other wheels may be constructed embodying my invention. The axle 10 has the usual spindle 11 and nut 12, and the latter is covered by the dust cap 13. The hub A comprises a conical sleeve 14 having at its larger end a flange 15, and having its smaller end adapted to threadedly engage a retaining nut $16^a$. In the embodiment shown the sleeve 14 is keyed to the spindle 11 as by a key 17; in cases where the wheel rotates upon the spindle the key is dispensed with. The inside of the flange 15 and hub plate 16 are radially corrugated as at 34 as shown in Figure 3, the said hub plate, together with the spools 18, 19, being mounted on the sleeve 14 as by the said retaining nut $16^a$; the sleeve 14, spools 18, 19, hub plate 16 and retaining nut $16^a$ constitute the hub assembly A, the whole being adapted to rotate together. By suitably proportioning the sleeve 14, the hub, and consequently the wheel, may be adapted to fit different spindles. The hub plate 16 has a collar 20 adapted to threadedly engage the dust cap 13, and the nut 12 adapted to threadedly engage the spindle 11 bears against the face of the said collar 20. The spools 18, 19 are formed in the shape of concave conoids, the smaller ends thereof being complementary, and engaging each other.

The rim of the wheel is designated generally by B, and comprises an outer rim 21, of a form suitable for retaining the type of tire used on the wheel, (a pneumatic tire 22 being shown in the drawings, but it is obvious that a solid tire may be likewise employed) an inner rim 23 formed to the shape of a channel as by inwardly extending flanges 24, $24^a$ and a plurality of bolts $25^a$ adapted to pass between the said outer rim 21 and the inner rim 23, the said bolts $25^a$ being adapted to mount the outer rim upon the inner rim as by lugs 25, whereby the said outer rim, with the tire 22 mounted thereon, may be removed or demounted from the wheel.

The body of the wheel, indicated generally by C, comprises resilient side plates 26, 27, adapted to enclose a resilient annular air container or tube 28. The said side plates are constructed of rubber, fabric or other resilient material. A metal hoop 29 is embedded in the outer periphery of each side plate. Each of the side plates has an aperture 30 medially thereof, of suitable dimensions to engage the opposite ends of the sleeve 14. A plurality of metal hoops 31 are embedded in the side plates concentrically to said apertures and the side plates are thickened in the vicinity of said apertures and outwardly therefrom a distance corresponding to the diameter of the flange 15 and hub plate 16 so as to form bosses 32. The outer face of the said boss 32 is radially corrugated as at 33 so as to be complementary to the radial corrugations 34 of the flange and hub plate, whereby the side plates are locked to the hub assembly. A valve stem 35 is provided communicating with the air container 28 and adapted to extend through one of the side plates as shown at 36 for the purpose of inflating the container, whereupon the said container is adapted to occupy the annular chamber, as at 37, between the hub A, inner rim 23 and side plates 26, 27. If sufficient pressure is maintained in the container 28 the body C of the wheel is adapted to assume the nature of a comparatively rigid structure, while at the same time possessing sufficient resiliency to absorb road shocks and the like incident to the use of the wheel.

In assembling the wheel, the sleeve 14 being provided and the inner rim 23 placed concentrically thereto, the side plate 27 is mounted on the sleeve 14 with the boss facing outwardly so as to engage the flange 15, the outer periphery of the side plate engaging the inside of the flange 24 of the inner rim; the spool 19 is mounted on the sleeve, the air container is placed in position, the spool 18 is then mounted on the sleeve, the complementary concave conoidal shape thereof being adapted to form a seat for the air container; the side plate 26 is then mounted on the spool with the boss facing outwardly and the outer periphery of the plate is brought inside the flange 24ª of the inner rim 23; the hub plate 16 is then mounted on the sleeve so as to have its corrugations engage the corrugations on the side plate; and the whole is clamped together as by the nut 16ª. The air container may then be inflated as described.

I claim:

1. A wheel comprising a conical sleeve having a flange at its larger end, complementary concave conoidal spools mounted on said sleeve, a hub plate mounted on the smaller end of said sleeve, a retaining nut threadedly engaging said sleeve and adapted to bear against said hub plate, resilient side plates adapted to be mounted on said sleeve, one of said side plates being positioned between said flange and one of said spools, the other of said side plates being positioned between said hub plate and the other of said spools, a channel shaped rim adapted to be positioned concentrically to said sleeve, the flanges of said channel pointing inwardly, the outer periphery of each of said side plates being positioned inside said flanges of said channel, and a resilient air container having the shape of an annulus positioned between said side plates, the complementary concave conoidal shape of said spools being adapted to form a seat for said air container.

2. A vehicle wheel comprising a conical sleeve, flanges mounted on said sleeve, complementary concave conoidal spools mounted on said sleeve intermediate said flanges, resilient side plates mounted on said sleeve intermediate said spools and said flanges, a rim disposed about said sleeve adapted to engage said side plates, and an inflatable resilient annular air container positioned intermediate said side plates.

3. In a vehicle wheel as described in claim 2, metal hoops embedded in the outer peripheries of said side plates, said side plates having medial apertures provided concentrically to said sleeve, a plurality of metal hoops embedded in said side plates concentrically to said apertures, bosses formed integrally with said side plates and concentrically to said apertures, said bosses and said flanges having radially extending complementary corrugations.

In testimony whereof I affix my signature.

OTTO WADDELL.